Patented July 4, 1950  2,513,819

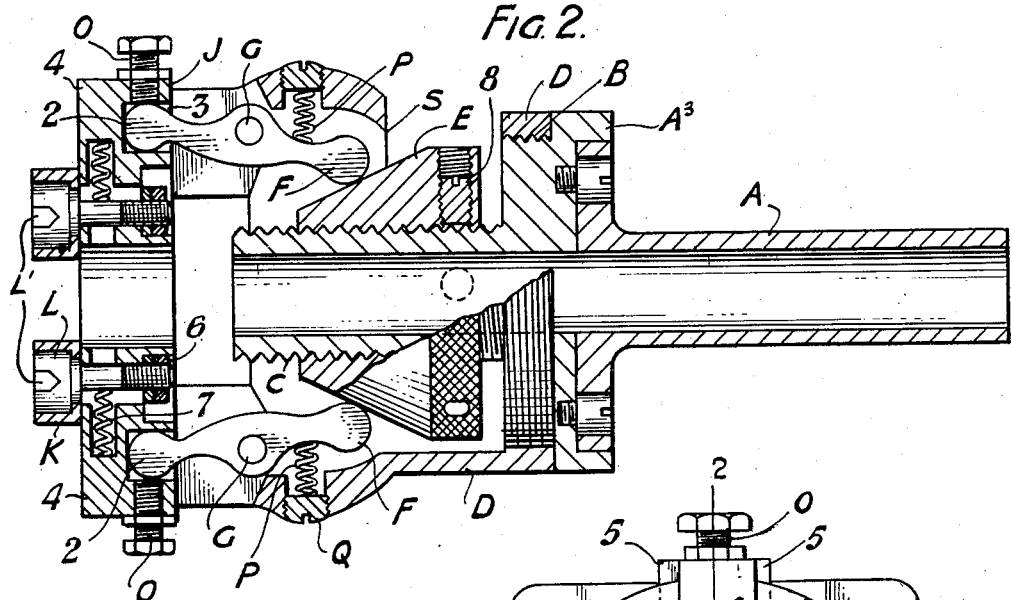
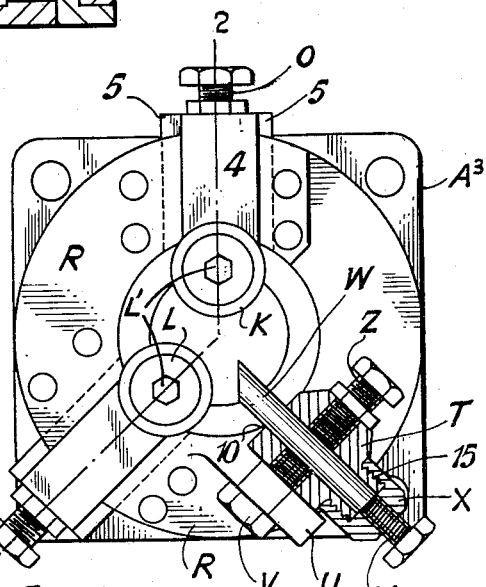
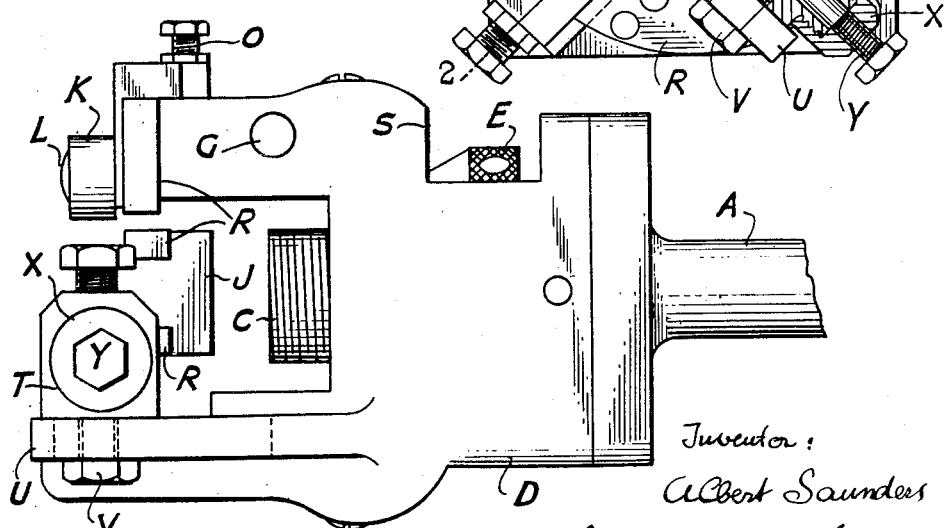

UNITED STATES PATENT OFFICE 2,513,819

ROLLER BOX FOR TURRET MACHINE TOOLS

Albert Saunders, Denham, England

Application July 27, 1945, Serial No. 607,339
In Great Britain October 20, 1941

Section 1, Public Law 690, August 8, 1946
Patent expires October 20, 1961

3 Claims. (Cl. 82—35)

This invention relates to improvements in roller boxes for turret machine tools as claimed in my copending U. S. Patent Application Serial No. 607,338.

I modify my prior construction of roller boxes by mounting the rollers on slides, instead of carrying them directly on the levers. I further provide means whereby each roller may be adjusted independently of the other rollers, and then clamped to provide compensation for wear in the turret, indexing mechanism or like cause of want of alignment.

I also replace the toothed ring and spring locking member by clamping screws fitting in the cone itself.

Other detailed improvements will be obvious from the description with reference to the accompanying drawings which illustrate an embodiment of my invention.

Fig. 1 is an end elevation.
Fig. 2 is an axial section.
Fig. 3 is a side elevation.

The stem is made in two parts. A for holding the roller box tight in the turret of a machine tool being piloted into a casing A3, so that the box can either be held by the stem A or fixed directly to the turret by means of screws, which help to shorten the box permitting a larger diameter hole through to the turret hole. Screw threads B and C are part of casing A3, part B being made to screw into housing D which is the support for everything contained in the box. Screw thread C is made for adjuster E to travel backwards and forwards so that rockers F which are pivoted at G rest on conical surface of adjuster E. Rocker arm ends 2 are located in slots 3 of roller holders 4 and are the means of moving roller holders when the adjuster E determines their action. The roller holders have slides 5 cut in them, so that when actuated they can move either way on slide provisions in housing D. Screwed shafts L, which have bearing surfaces for carrying the rollers K, fit into elongated slots in the roller holders 4 and are adjusted and tightened by nuts 6 in recesses therein by a suitable wrench fitting in sockets L'. Springs 7, which fit into drillings in the roller holders, are for keeping the tension on the shafts before tightening the rollers. To keep rollers fast and take up play after adjustment the roller holders are threaded to receive screws O. Springs P are held tight to adjuster by cap Q and slide covers R support roller holders 4 and act as guides for sliding the roller holders. A recess is cut in the housing D through which knurled surface G of adjuster F protrudes so that it can be adjusted from outside the box through which screws 8 are tightened to the shaft when adjustment is made. When the adjuster E is moved it actuates both the rollers equally, so that they are simultaneously adjusted for any diameter setting.

Provision on housing D is made for a tool holder T having a support U through which a slot is cut so that the tool holder can be moved along and swivelled at nut V before tightening. Tool holder T comprises a hole 10 for a tool W passing through and a screw thread 15 is extended on the holder to receive a screwed cap X containing an adjustable screw Y registering against the end of the tool for adjustment, and screw Z keeps the tool tight when in operation. If the tool requires regrinding screw Z is slackened and cap X removed so that the tool holder, which may be set at a special angle, is not disturbed.

What I claim is:

1. A roller box tool steady for use with machine tools, comprising a housing, a cylindrical member extending axially within said housing and held therein, external threading upon said cylindrical member, a cone-shaped member with an axial bore therein, internal screw-threading upon said axial bore to allow the cone-shaped member to be screwed upon said cylindrical member, a plurality of roller assemblies, each including a slide block carrying a roller, radially disposed slideways in said housing to accommodate said slide blocks and permit them to slide freely radially in said housing, rocker arms engaging each of said slide blocks, pivotal anchorages in the housing for each of said rocker arms, recesses in each of said slide blocks to receive one extremity of one of said rocker arms and means to maintain the other extremity of each of said rocker arms in contact with said adjustable cone.

2. A roller box tool steady as claimed in claim 1 and further comprising means for mounting and fastening each roller upon a slide block, said means consisting of a roller spindle, an enlarged head on said spindle, a bearing surface on said enlarged head to receive said roller, screw-threading on the end of said roller spindle, an elongated slot in the slide block to receive said spindle, a nut on the screwed portion of said spindle, a widened recess in said slot to receive said nut, a spring in said block to bear on said spindle and means on said head portion for engagement with a device to allow the same to be turned to free the spindle when desired.

3. A roller box tool steady as claimed in claim 1 and further comprising means for adjustably retaining the extremity of each rocker arm in its recess in the associated slide block, consisting of a screw, an internally screw threaded bore opening into the recess and means for locking said screw in any desired position of adjustment within said bore.

ALBERT SAUNDERS.

REFERENCES CITED

The following references are of record in the file of this patent:

UNITED STATES PATENTS

| Number | Name | Date |
|---|---|---|
| 1,906,100 | Richardson | Apr. 25, 1933 |
| 2,311,211 | Class | Feb. 16, 1943 |

FOREIGN PATENTS

| Number | Country | Date |
|---|---|---|
| 13,837 | Great Britain | 1905 |
| 373,365 | Great Britain | May 26, 1932 |
| 485,107 | Great Britain | May 16, 1938 |
| 545,143 | Great Britain | May 12, 1942 |